(12) United States Patent
Koike

(10) Patent No.: US 9,246,608 B2
(45) Date of Patent: Jan. 26, 2016

(54) MEASUREMENT CIRCUIT, WIRELESS COMMUNICATION DEVICE, AND MEASUREMENT METHOD

(71) Applicant: FUJITSU LIMITED, Kawasaki-shi, Kanagawa (JP)

(72) Inventor: Chimato Koike, Fujisawa (JP)

(73) Assignee: FUJITSU LIMITED, Kawasaki (JP)

( * ) Notice: Subject to any disclaimer, the term of this patent is extended or adjusted under 35 U.S.C. 154(b) by 210 days.

(21) Appl. No.: 14/140,338

(22) Filed: Dec. 24, 2013

(65) Prior Publication Data
US 2014/0192665 A1 Jul. 10, 2014

(30) Foreign Application Priority Data
Jan. 7, 2013 (JP) ................................. 2013-000703

(51) Int. Cl.
*H04B 17/00* (2015.01)
*H04B 17/318* (2015.01)

(52) U.S. Cl.
CPC .................................... *H04B 17/318* (2015.01)

(58) Field of Classification Search
CPC .......... H04B 1/30; H04B 17/318; H04B 1/16; H04B 7/0617; H04B 1/1027; H04B 17/309; H04B 1/006; H04B 1/0475; H04B 1/1036; H04B 1/109; H04B 1/1638; H04B 1/525; H04B 7/2643; H04W 36/0083; H04W 16/28; H04W 12/08; H04W 16/14

USPC ....................................................... 455/67.11
See application file for complete search history.

(56) References Cited

U.S. PATENT DOCUMENTS

| | | | | |
|---|---|---|---|---|
| 2014/0228072 | A1* | 8/2014 | Clark | H04B 1/006 455/552.1 |
| 2014/0334627 | A1* | 11/2014 | Kulavik | H03G 5/16 381/57 |

FOREIGN PATENT DOCUMENTS

| | | |
|---|---|---|
| JP | 7-35800 A | 2/1995 |
| JP | 2004-336470 A | 11/2004 |

* cited by examiner

*Primary Examiner* — Ajibola Akinyemi
(74) *Attorney, Agent, or Firm* — Arent Fox LLP

(57) ABSTRACT

A measurement circuit including: a memory, and a processor coupled to the memory and configured to measure a first signal strength of a received signal within a first frequency band, the received signal including a signal transmitted from a first transmitting apparatus within the first frequency band and a signal transmitted from a second transmitting apparatus within a second frequency band that constitutes a part of the first frequency band, to generate a second signal strength of the signal transmitted from the second transmitting apparatus within the second frequency band, and to generate a third signal strength of the received signal within the second frequency band based on the first signal strength and the second signal strength.

20 Claims, 17 Drawing Sheets

MEASUREMENT CIRCUIT, WIRELESS COMMUNICATION DEVICE, AND MEASUREMENT METHOD

CROSS-REFERENCE TO RELATED APPLICATION

This application is based upon and claims the benefit of priority of the prior Japanese Patent Application No. 2013-000703, filed on Jan. 7, 2013, the entire contents of which are incorporated herein by reference.

FIELD

The embodiments discussed herein are related to a measurement circuit, a wireless communication device, and a measurement method.

BACKGROUND in the related arts, a technology is known by which reception electric field strength that is corrected depending on characteristic change due to variation of temperature and variation of power-supply voltage is detected in a mobile wireless communication device (for example, see Japanese Laid-open Patent Publication No, 7-35809).

In recent years, a mobile communication system using orthogonal frequency division multiple access (OFDMA) having high spectrum efficiency has been put to practical use in order to cope with an increase in a data amount of wireless communication. For example, as a mobile phone system, standards of Long Term Evolution (LTE) have been developed in 3rd generation partnership project (3GPP).

In LTE, OFDMA is used in a downlink that corresponds to communication from a base station to a wireless terminal, in addition, single carrier-frequency division multiple access (SC-FDMA) is used in an uplink that corresponds to communication from a wireless terminal to a base station.

In LTE, when a plurality of base stations exists, handover is used by which a wireless terminal is coupled to an optimal base station. The wireless terminal periodically detects a neighboring cell (cell is the area in which communication with a base station is allowed to be performed) while communicating with a base station to which the wireless terminal is being coupled and reports reception quality of the cell to the base station to which the wireless terminal is being coupled. That procedure is called "Measurement". The base station that receives the report from the wireless terminal selects an optimal cell from a list of cells and the reception qualities, and executes processing of changing the base station that is a connection destination. That procedure is called "Handover".

As the reception quality that is reported to the base station, for example, there is reference signal reception power (RSRP) and reference signal reception quality (RSRQ). The RSRQ is calculated from the RSRP and a received signal strength indicator (RSSI). The RSRP and the RSSI are measured using a received signal of an OFDM symbol that includes a reference signal (RS) that is transmitted in a downlink.

For example, in a definition of 3GPP, an RSSI is defined as an average value of the total reception power (serving cell, neighboring cell, thermal noise, and the like) that are observed in OFDM symbols that include RSs on the certain number of resource blocks. As a method of measuring such an RSSI, there is a time domain method of measuring an RSSI in a time domain and a frequency domain method of measuring an RSSI in a frequency domain.

SUMMARY

According to an aspect of the invention, a measurement circuit includes a memory, and a processor coupled to the memory and configured to measure a first signal strength of a received signal within a first frequency band, the received signal including a signal transmitted from a first transmitting apparatus within the first frequency band and a signal transmitted from a second transmitting apparatus within a second frequency band that constitutes a part of the first frequency band, to generate a second signal strength of the signal transmitted from the second transmitting apparatus within the second frequency band, and to generate a third signal strength of the received signal within the second frequency band based on the first signal strength and the second signal strength.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the above-described related art, there is a case in which RSRQ may not be measured efficiently. For example, when an RSSI is measured in the frequency domain, a received signal in a time domain is converted into a frequency band at reception timing, so that a computational complexity is increased. On the other hand, when the RSSI is measured in the time domain, power in a band outside of measurement target band is included in the measurement result, so that RSRQ is not calculated accurately.

An object of the embodiments discussed herein is to provide a measurement circuit, a wireless communication device, and a measurement method that efficiently measures RSRQ in order to solve the above-described problems in the related art.

A measurement circuit, a wireless communication device, and a measurement method according to the embodiments discussed herein are described below in detail with reference to accompanying drawings.

First Embodiment

Structure of a Measurement Circuit According to a First Embodiment

Figure 1:
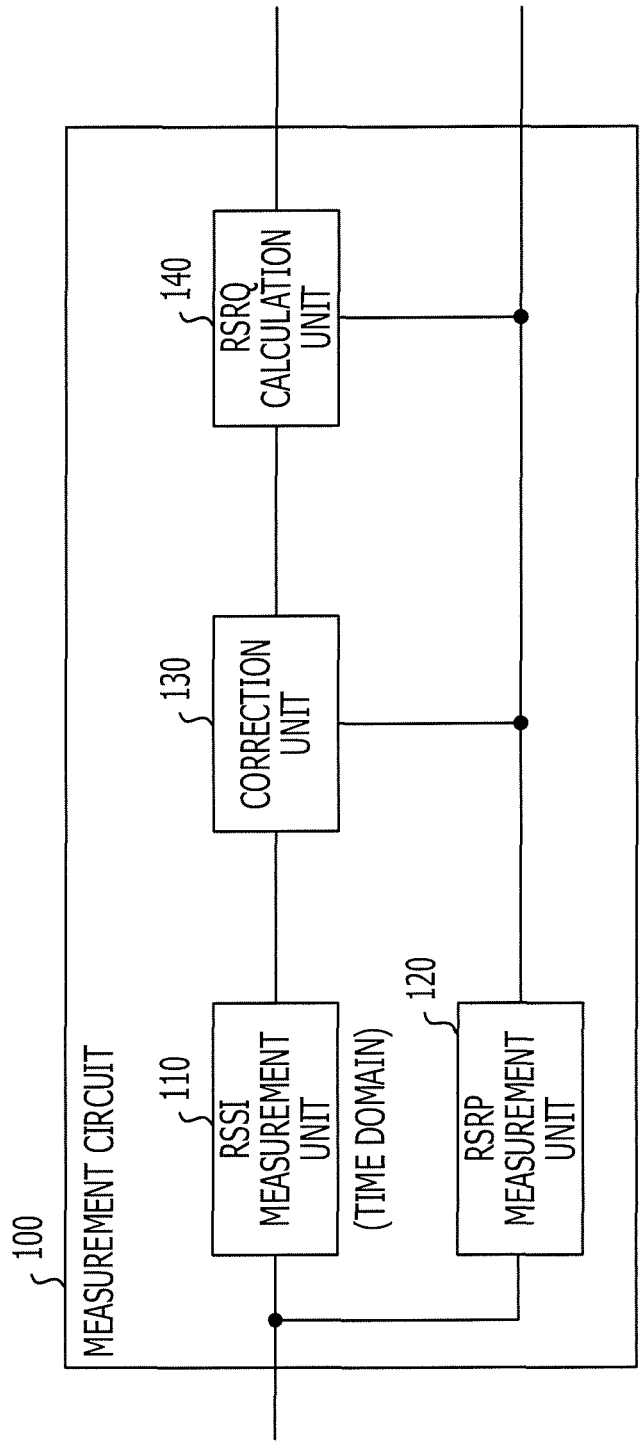
FIG. 1 is a diagram illustrating an example of a structure of a measurement circuit according to a first embodiment.
Figure 2:
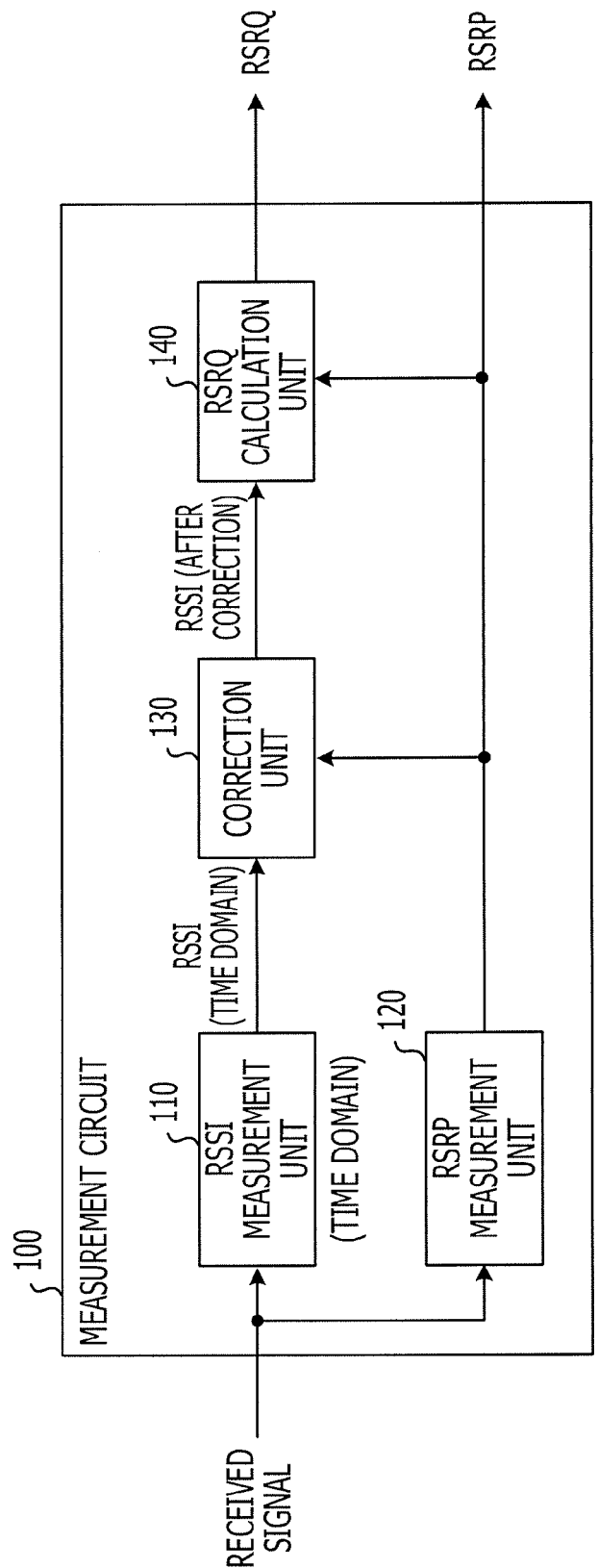
FIG. 2 is a diagram illustrating an example of a flow of a signal in the measurement circuit illustrated in FIG. 1.

FIG. 1 is a diagram illustrating an example of a structure of a measurement circuit according to a first embodiment. FIG. 2 is a diagram illustrating an example of a flow of a signal in the measurement circuit illustrated in FIG. 1. As illustrated in FIGS. 1 and 2, a measurement circuit 100 according to the first embodiment includes an RSSI measurement unit 110, an RSRP measurement unit 120, a correction unit 130, and RSRQ calculation unit 140.

The measurement circuit 100 measures RSRP and RSRQ based on an input received signal. The received signal is, for example, a signal on which multiplexing is performed by orthogonal frequency division multiplexing (OFDM). Various multiplexing schemes may be applied to the received signal in addition to OFDM.

<RSSI Measurement Unit 110>

The RSSI measurement unit 110 measures an RSSI based on a received signal that is input to the measurement circuit 100, in a time domain. For example, the RSSI measurement unit 110 measures average power in OFDM symbols that include RSs out of OFDM symbols in a time domain in a received signal. The RSSI measurement unit 110 outputs the measured RSSI to the correction unit 130.

<RSRP Measurement Unit 120>

The RSRP measurement unit 120 measures RSRP based on a received signal that is input to the measurement circuit 100. For example, the RSRP measurement unit 120 measures power of an RS that is included in the received signal. Here, the RSRP measurement unit 120 transforms the received signal into a frequency domain by Fast Fourier Transform (FFT), and measures RSRP in the frequency domain on the basis of the transformed signal. Here, the RSRP measurement unit 120 may measure RSRP in a time domain.

The RSRP measurement unit 120 outputs the measured RSRP to the correction unit 130 and the RSRQ calculation unit 140. In addition, the RSRP measurement unit 120 outputs the measured RSRP from the measurement circuit 100.

<Correction Unit 130>

The correction unit 130 corrects the RSSI that is output from the RSSI measurement unit 110 on the basis of the RSRP that is output from the RSRP measurement unit 120. For example, the correction unit 130 corrects the RSSI in the time domain, which is output from the RSSI measurement unit 110, by correcting interference power outside an effective bandwidth using the RSRP that is output from the RSRP measurement unit 120. The correction unit 130 outputs the corrected RSSI to the RSRQ calculation unit 140.

<RSRQ Calculation Unit 140>

The RSRQ calculation unit 140 calculates RSRQ on the basis of the RSSI that is output from the correction unit 130 and the RSRP that is output from the RSRP measurement unit 120. For example, the RSRQ calculation unit 140 calculates RSRQ by calculating a ratio of the RSSI that is output from the correction unit 130 to the RSRP that is output from the RSRP measurement unit 120. The RSRQ calculation unit 140 outputs the calculated RSRQ from the measurement circuit 100.

Therefore, output of the RSRP and the RSRQ based on the received signal that is input to the measurement circuit 100 is performed. In addition, the RSRQ is calculated accurately by correcting the RSSI that is measured in the time domain using the RSRP that is measured to be output with the RSRQ, without measuring the RSSI in the frequency domain. Therefore, the RSRQ is calculated accurately while an increase in a computational complexity is suppressed.

(Structure of a Subframe in a Downlink)

Figure 3:
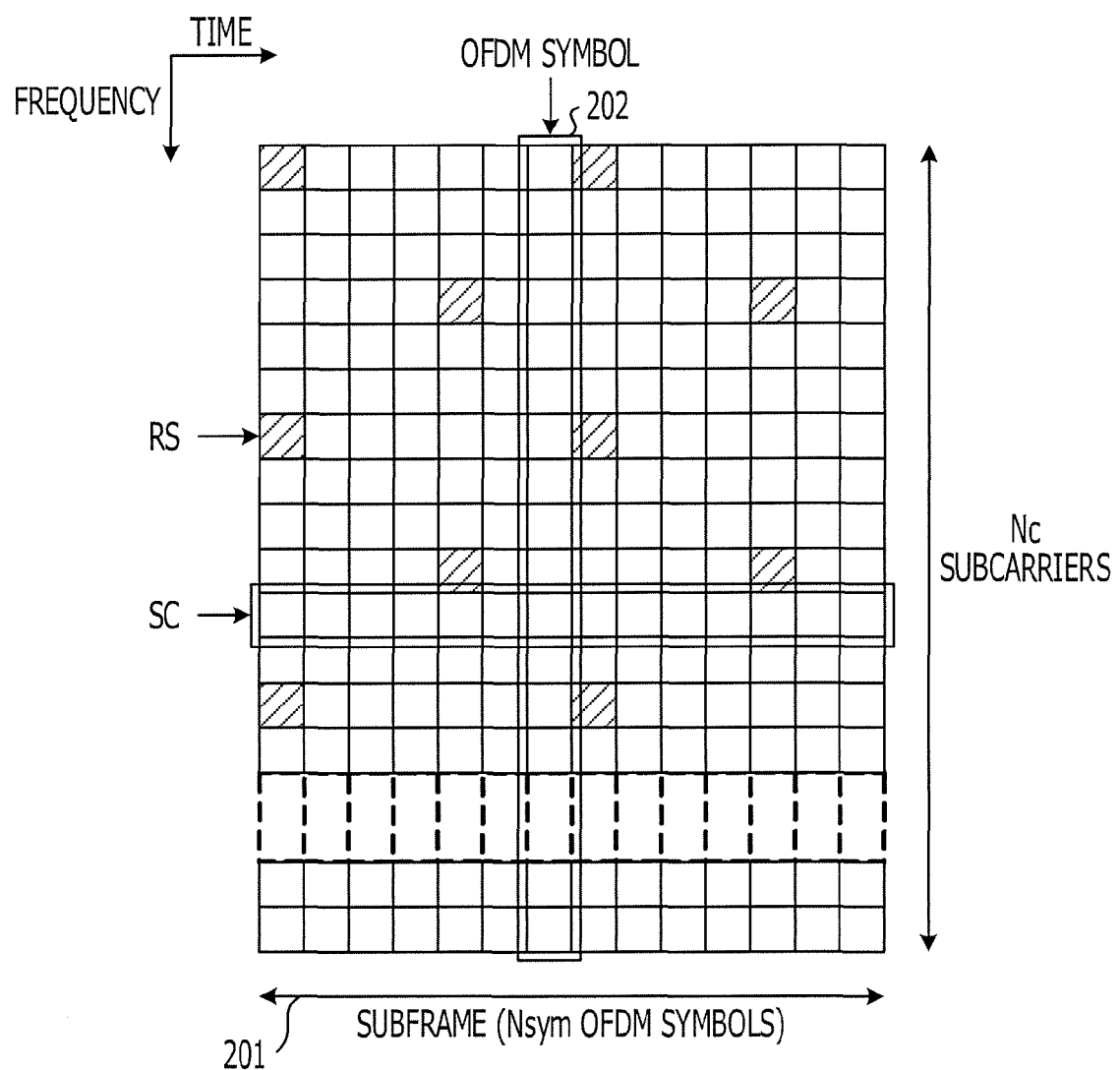
FIG. 3 is a diagram illustrating an example of a structure of a subframe in a downlink.

FIG. 3 is a diagram illustrating an example of a structure of a subframe in a downlink. In FIG. 3, the horizontal axis indicates a time, and the vertical axis indicates a frequency. A single subframe consists of several OFDM symbols. Nsym is the number of OFDM symbols in a subframe 201.

A single OFDM symbol consists of subcarriers. Nc is the number of subcarriers in an OFDM symbol 202. A signal that is modulated by quadrature phase shift keying (QPSK), quadrature amplitude modulation (16QAM), 64QAM, or the like is allocated on a subcarrier. In a single radio frame, 10 subframes are included.

In addition, in the subframe 201, RSs that are used to measure a status of a propagation path in the wireless terminal (shaded areas in FIG. 3) are included. For example, in LTE, as illustrated in FIG. 3, an RS is allocated for every 6 subcarrier in several OFDM symbols in the subframe. The RS has a certain value known in both the base station and the wireless terminal, so that the wireless terminal may measure the status of the propagation path by comparing the RS that is included in the received signal.

The set of 12 subcarriers in a subframe is called "resource block" (RB). RB is the minimum unit of user data allocation.

(Signal in the Time Domain)

Figure 4A:
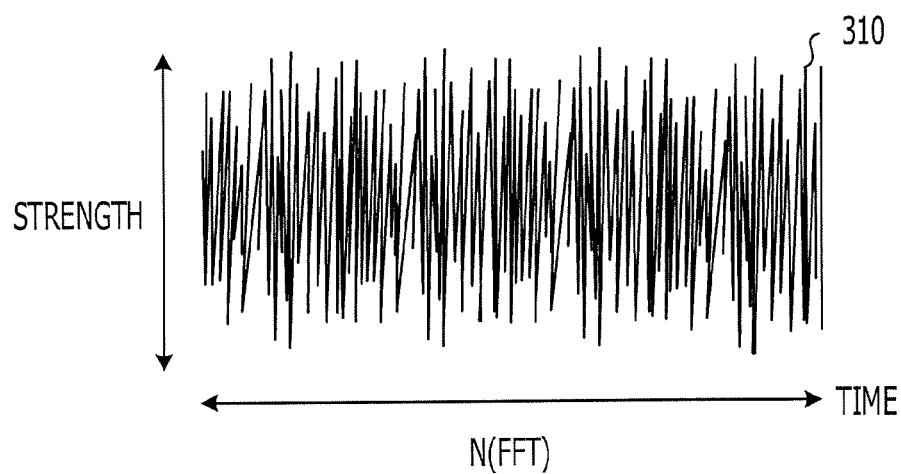
FIG. 4A is a diagram illustrating an example of a signal in a time domain.

FIG. 4A is a diagram illustrating an example of a signal in the time domain. In FIG. 4A, the horizontal direction indicates a time, and the vertical direction indicates strength. A signal 310 illustrated in FIG. 4A indicates a signal in the time domain. The base station transforms a signal in the frequency domain into the signal 310 in the time domain, for example, by inverse fast fourier transform (IFFT) and performs wireless transmission on the transformed signal. The wireless terminal receives the signal 310 in the time domain, which is transmitted from the base station.

(Signal in the Frequency Domain)

Figure 4B:
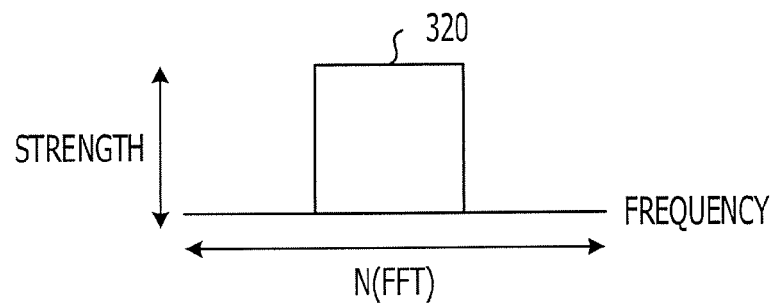
FIG. 4B is a diagram illustrating an example of a signal in a frequency domain.

FIG. 4B is a diagram illustrating an example of a signal in the frequency domain. In FIG. 4B, the horizontal direction indicates a frequency, and the vertical direction indicates strength. A signal 320 illustrated in FIG. 4B indicates a signal in the frequency domain. The wireless terminal transforms the signal 310 in the time domain, which is received from the base station, into the signal 320 in the frequency domain, for example, by FFT, and executes reception processing for the transformed signal.

The measurement circuit 100 may obtain "dl-Bandwidth" that is a number of RBs in the system bandwidth of a cell (serving cell, which corresponds to a serving base station) in communication and "allowedMeasBandwidth" that is a maximum number of RBs in the bandwidth in which measurement is performed. Hereinafter, "dl-Bandwidth" is referred to as a system bandwidth Ndl, and "allowedMeasBandwidth" is referred to as a measurement bandwidth Nmeas. In this application, a system band having the system bandwidth Ndl may be referred to as a first frequency band. Moreover, a measurement band having the measurement bandwidth Nmeas may be referred to as a second frequency band.

Each of the system bandwidth Ndl and the measurement bandwidth Nmeas becomes, for example, any of 6RB, 15RB, 25RB, 50RB, 75RB, and 100RB. For example, in a case in which "system bandwidth Ndl>measurement bandwidth Nmeas" is satisfied, when the measurement is performed by the frequency domain method, an effective bandwidth of a neighboring cell is merely measured accurately. In addition, when the measurement is performed by the time domain method, interference power outside the effective bandwidth that is specified by the measurement bandwidth Nmeas is also included in the measurement.

The system bandwidth of the neighboring cell (which corresponds to one of candidates of a target base station for handover performed by the wireless terminal) is obtained, for example, by decoding a physical broadcast channel (PBCH). Here, it takes a long time to execute the decoding processing, so that decoding of the PBCH may not be executed when measurement of the neighboring cell is performed. In this case, the measurement may be performed using the measurement bandwidth Nmeas that is notified from the base station for each center frequency.

(RSSI that is Measured by the RSSI Measurement Unit)

Figure 5A:
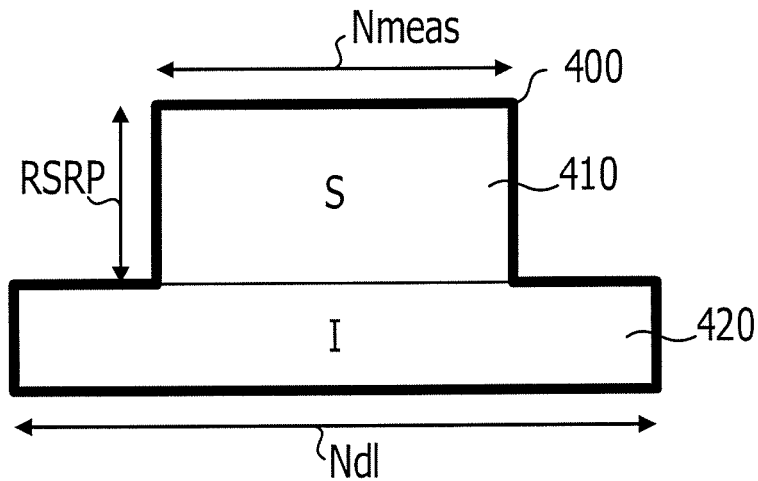
FIG. 5A is a diagram illustrating an example of an RSSI that is measured by an RSSI measurement unit.

FIG. 5A is a diagram illustrating an example of an RSSI that is measured by the RSSI measurement unit. In FIG. 5A, the horizontal direction indicates a frequency. The system bandwidth Ndl and the measurement bandwidth Nmeas illustrated in FIG. 5A respectively correspond to "dl-Bandwidth" and "allowedMeasBandwidth" that are notified from the base station.

RSSI 400 illustrated in FIG. 5A is an RSSI in the time domain, which is measured by the RSSI measurement unit 110. As illustrated in FIG. 5A, in the RSSI 400 that measured in the time domain, signal power 410 of a measurement target cell and interference power 420 from a serving cell are included. In addition, in the RSSI 400 that is measured in the time domain, interference power in the whole system bandwidth Ndl is included. Therefore, in the RSSI 400, interference power outside the measurement bandwidth Nmeas is also included.

The size of the signal power 410 is represented as "S", and the size of the interference power 420 is represented as "I". In this case, the size of the RSSI 400 in the time domain, which is measured by the RSSI measurement unit 110 is represented, for example, by the following formula (1). In this application, the "RSSI" may be referred to as a first signal strength. Moreover, the "S" may be referred to as a second signal strength.

[Mathematical Expression 1]

$$RSSI = S + I$$

$$\therefore I = RSSI - S \tag{1}$$

(RSSI that is Measured in the Frequency Domain)

Figure 5B:
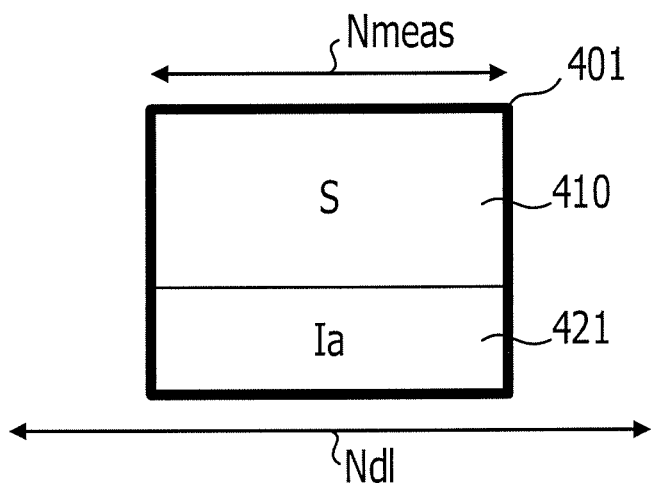
FIG. 5B is a diagram illustrating an example of an RSSI that is measured in the frequency domain.

FIG. 5B is a diagram illustrating an example of an RSSI that is measured in the frequency domain. In FIG. 5B, the same reference numerals are given to portions that are similar to those of FIG. 5A, and the description is omitted herein. When it is assumed that the received signal is transformed into the frequency domain by FFT and the RSSI is measured, as illustrated in FIG. 5B, an RSSI 401 of the merely measurement bandwidth Nmeas is measured. Interference power 421 illustrated in FIG. 5B is interference power that is included in the measurement bandwidth Nmeas. The size of the interference power 421 illustrated in FIG. 5B is represented as "Ia".

When the size of the RSSI 401 is represented as "RSSIa", "RSSIa" is represented, for example, by the following formula (2). That is, the interference power "I" that is measured in the time domain (interference power 420 illustrated in FIG. 5A) is converted by a ratio of the system bandwidth Ndl to the measurement bandwidth Nmeas, and "RSSIa" may be calculated by adding the converted interference power to the signal power S of the measurement target cell. In this application, the "RSSIa" may be referred to as a third signal strength.

[Mathematical expression 2]

$$RSSIa = S + \frac{Nmeas}{Ndl} I \tag{2}$$

When the above-described formula (1) is substituted into the above-described formula (2), the size "RSSIa" of the RSSI 401 of the merely measurement bandwidth Nmeas may be represented by the following formula (3).

[Mathematical expression 3]

$$RSSIa = S + \frac{Nmeas}{Ndl}(RSSI - S) \tag{3}$$
$$= \frac{Nmeas \cdot RSSI + (Ndl - Nmeas) \cdot S}{Ndl}$$

In addition, for example, since an RB contains 12 subcarriers, the size S of the signal power 410 is represented by the following formula (4) using the RSRP that is measured by the RSRP measurement unit 120. That is, the RSRP that is measured by the RSRP measurement unit 120 is multiplied by 12 and the measurement bandwidth Nmeas to perform transformation into an RSSI bandwidth and calculate the size S of the signal power 410.

[Mathematical Expression 4]

$$S = RSRP \times 12 \times Nmeas \tag{4}$$

Therefore, the correction unit 130 corrects the RSSI that is output from the RSSI measurement unit 110, on the basis of the above-described formulas (3) and (4), the RSRP, the system bandwidth Ndl, and the measurement bandwidth Nmeas, and obtains the size "RSSIa" of the RSSI 401. The RSRP is RSRP that is output from the RSRP measurement unit 120 to the correction unit 130. The system bandwidth Ndl and the measurement bandwidth Nmeas have been already notified from the base station or the like. The correction unit 130 outputs the size RSSIa of the RSSI 401 of the merely measurement bandwidth Nmeas to the RSRQ calculation unit 140.

As described above, the correction unit 130 perform correction so that interference power in a band that is different from the measurement bandwidth Nmeas is removed from the RSSI that is measured by the RSSI measurement unit 110, on the basis of the RSRP, the system bandwidth Ndl, and the measurement bandwidth Nmeas.

Therefore, an RSSI that is defined in 3GPP, that is, an average value of the total pieces of reception power (serving cell, neighboring cell, thermal noise, and the like) that are observed in OFDM symbols that include RSs on the certain number of resource blocks is obtained.

(Hardware Structure of a Wireless Terminal to which a Measurement Circuit is Applied)

Figure 6:
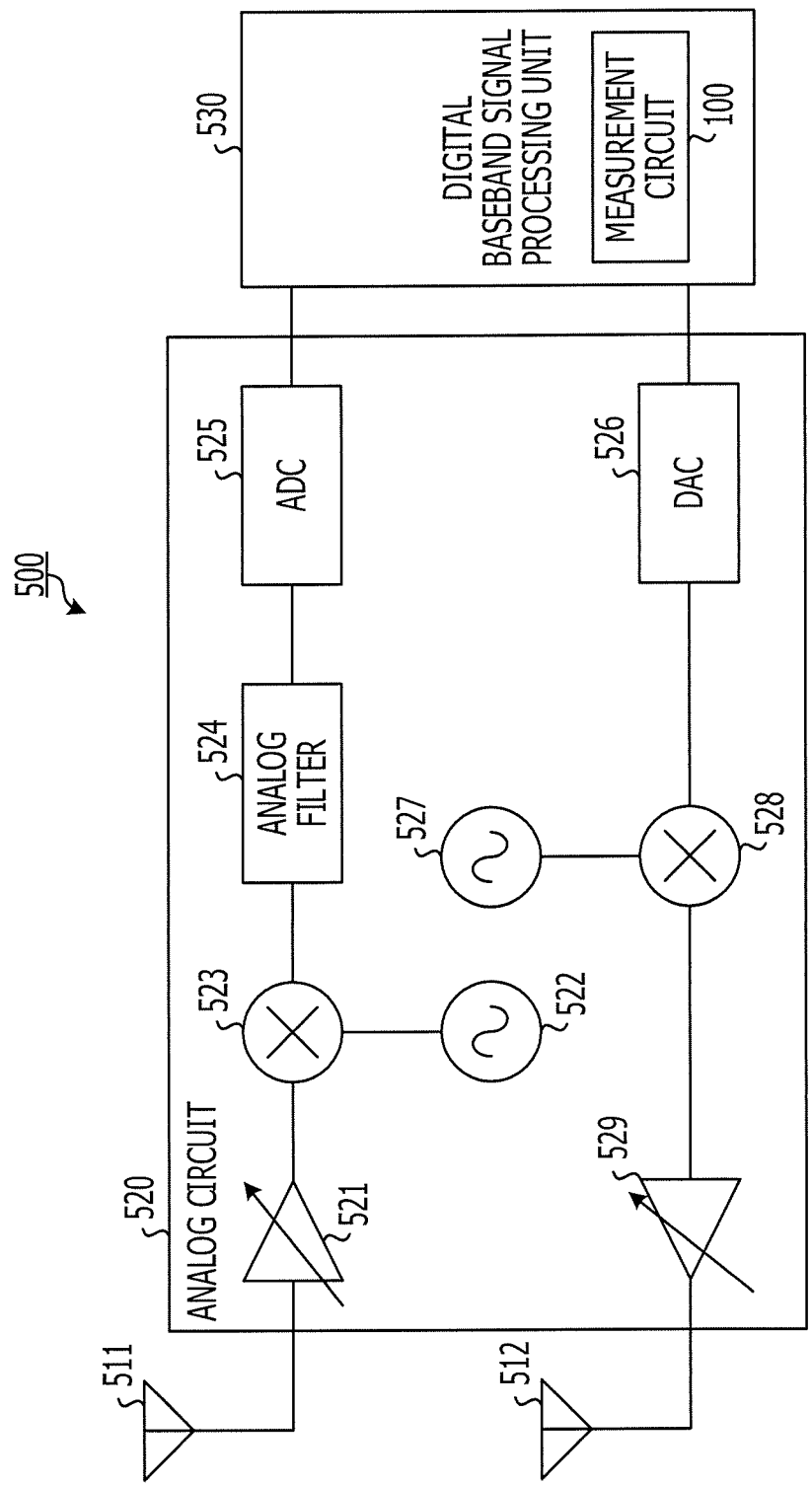
FIG. 6 is a diagram illustrating an example of a hardware structure of a wireless terminal to which the measurement circuit is applied.
Figure 7:
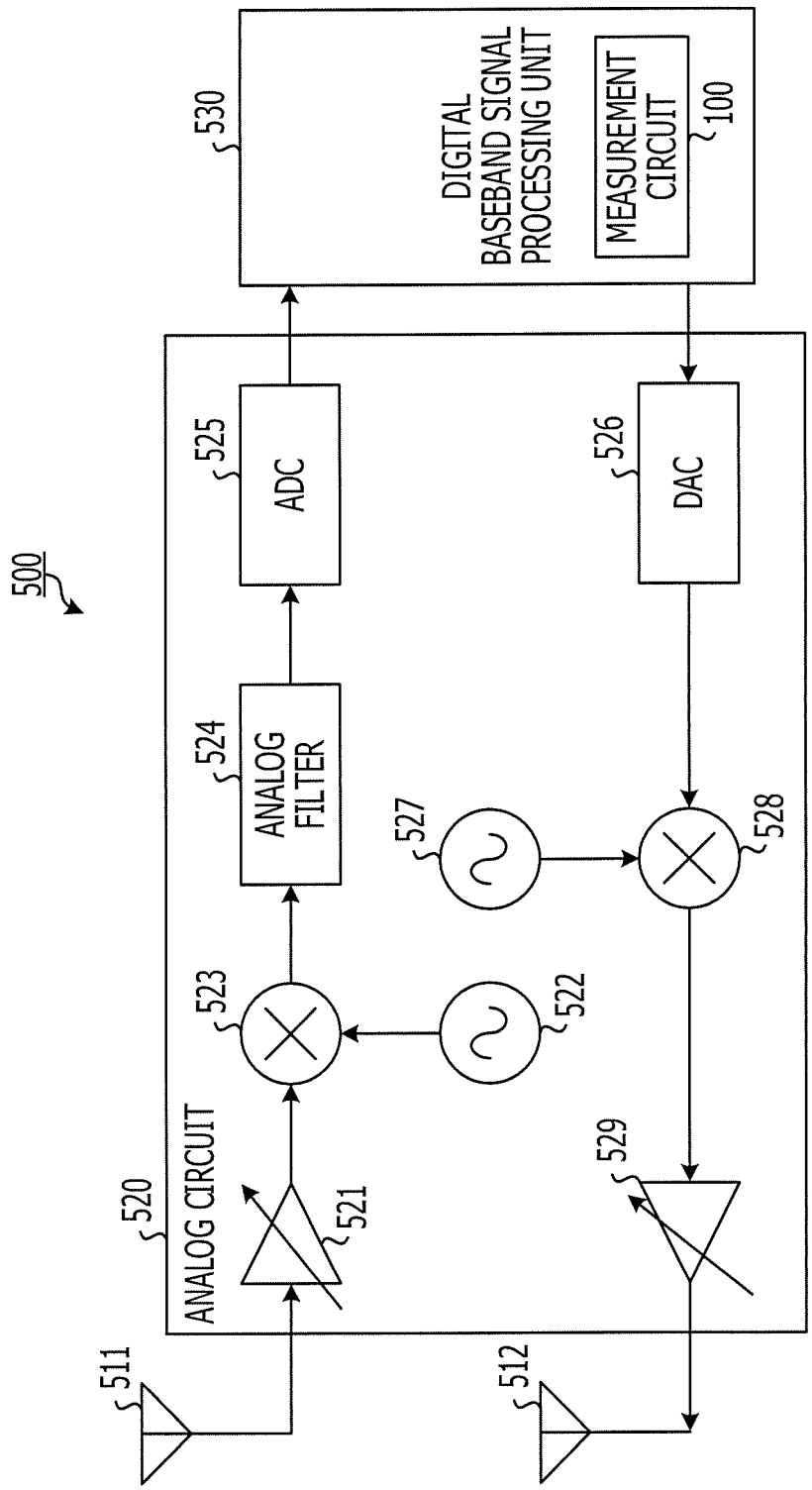
FIG. 7 is a diagram illustrating an example of a floe of a signal in the wireless terminal illustrated in FIG. 6.

FIG. 6 is a diagram illustrating an example of a hardware structure of a wireless terminal to which a measurement circuit is applied. FIG. 7 is a diagram illustrating an example of a flow of a signal in the wireless terminal illustrated in FIG. 6. A wireless terminal 500 illustrated in FIGS. 6 and 7 includes a reception antenna 511, a transmission antenna 512, an analog circuit 520, and a digital baseband signal processing unit 530.

<Reception Antenna 511 and Transmission Antenna 512>

The reception antenna 511 receives radio waves and outputs a received signal that indicates the reception result to the analog circuit 520. The transmission antenna 512 transmits a signal that is output from the analog circuit 520, through radio waves.

<Analog Circuit 520>

The analog circuit 520 includes an amplifier 521, an oscillator 522, a mixer 523, an analog filter 524, an analog/digital converter (ADC) 525, a digital/analog converter (DAC) 526, an oscillator 527, a mixer 528, and an amplifier 529.

The amplifier 521 amplifies the received signal that is output from the reception antenna 511 by a variable amplification amount and outputs the amplified received signal to the mixer 523. The oscillator 522 oscillates a dock signal having a certain frequency and outputs the oscillated clock signal to the mixer 523. The mixer 523 transforms the frequency of the received signal into a baseband by multiplying the received signal that is output from the amplifier 521 by the clock signal that is output from the oscillator 522. The mixer 523 outputs the received signal the frequency of which is transformed, to the analog filter 524.

The analog filter 524 permeates the received signal that is output from the mixer 523 and outputs the permeated received signal to the ADC 525. In addition, the analog filter 524 gives a certain permeation characteristic (frequency response) to a received signal to be permeated. For example, the analog filter 524 is a low pass filter (LPF), a band pass filter (BPF), or the like that merely permeates a certain frequency.

The ADC 525 converts a received signal that is output from the analog filter 524, from the analog signal to a digital signal. In addition, the ADC 525 outputs the received signal that is converted into the digital signal, to the digital baseband signal processing unit 530.

The DAC 526 converts a transmitted signal that is output from the digital baseband signal processing unit 530, from the digital signal to an analog signal. In addition, the DAC 526 outputs the transmitted signal that is converted into the analog signal, to the mixer 528. The oscillator 527 oscillates a clock signal having a certain frequency and outputs the oscillated clock signal to the mixer 528.

The mixer 528 transforms the frequency of the transmitted signal into a high frequency band by multiplying the transmitted signal that is output from the DAC 526 by the clock signal that is output from the oscillator 527. The mixer 528 outputs the transmitted signal the frequency of which is transformed, to the amplifier 529. The amplifier 529 amplifies, by a variable amplification amount, the transmitted signal that is output from the mixer 528, and outputs the amplified transmitted signal to the transmission antenna 512.

<Digital Baseband Signal Processing Unit 530>

The digital baseband signal processing unit 530 executes reception processing for the received signal that is output from the analog circuit 520. For example, the digital baseband signal processing unit 530 obtains information that indicates the above-described system bandwidth Ndl and measurement bandwidth Nmeas, which is included in the received signal, from the base station that performs wireless communication with the wireless terminal 500.

In addition, the measurement circuit 100 may be applied to the digital baseband signal processing unit 530. The measurement circuit 100 measures RSRP and RSRQ on the basis of the received signal that is output from the analog circuit 520, and the information that indicates the system bandwidth Ndl and the measurement bandwidth Nmeas, which is obtained from the received signal in the digital baseband signal processing unit 530.

In addition, the digital baseband signal processing unit 530 generates a signal to be transmitted from the wireless terminal 500, and outputs the generated signal to the analog circuit 520. For example, the digital baseband signal processing unit 530 generates a transmitted signal that is destined for the base station, which includes the RSRP and RSRQ that are measured by the measurement circuit 100, and outputs the generated transmitted signal to the analog circuit 520. Therefore, the RSRP and RSRQ that are measured on the basis of the received signal in the wireless terminal 500 are reported to the base station.

The digital baseband signal processing unit 530 may realize the above-described processing, for example, by a field programmable gate array (FPGA), a processor such as a digital signal processor (DSP), or the like.

(Operation of the Measurement Circuit According to the First Embodiment)

Figure 8:
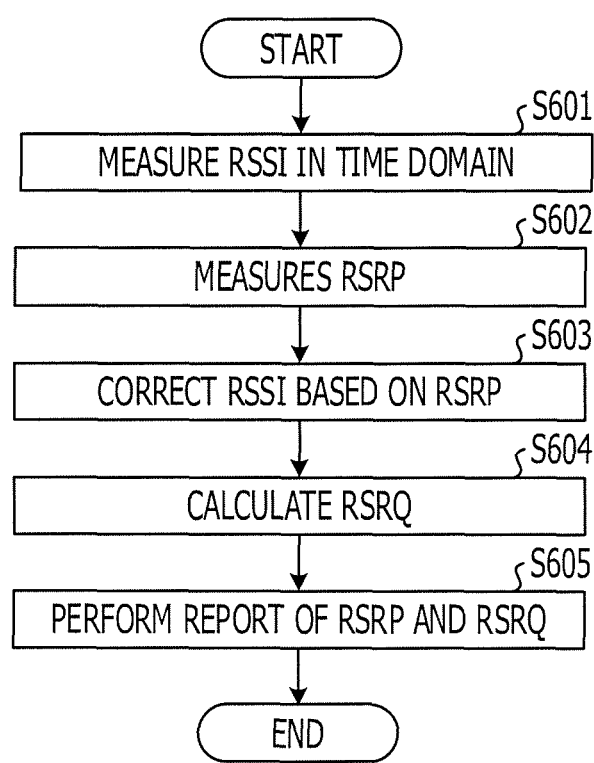
FIG. 8 is a flowchart illustrating an example of an operation of the measurement circuit according to the first embodiment.

FIG. 8 is a flowchart illustrating an example of an operation of the measurement circuit according to the first embodiment. The measurement circuit 100 executes each step illustrated in FIG. 8, for example, for each certain report cycle to the base station. First, the measurement circuit 100 measures an RSSI in the time domain on the basis of a received signal (Step S601). After that, the measurement circuit 100 measures RSRP on the basis of the received signal (Step S602).

After that, the measurement circuit 100 corrects the RSSI that is measured in Step S601, on the basis of the RSRP that is measured in Step S602 (Step S603). After that, the measurement circuit 100 calculates RSRQ on the basis of the RSRP that is measured in Step S602 and the RSSI that is corrected in Step S603 (Step S604).

After that, the measurement circuit 100 reports the RSRP that is measured in Step S602 and the RSRQ that is calculated in Step S604, to the base station or the like to which the wireless terminal 500 is being coupled (Step S605), and ends a series of operations. In Step S605, for example, the measurement circuit 100 generates a transmitted signal that is destined for the base station and that stores the RSRP and RSRQ, and outputs the generated transmitted signal to the DAC 526. Therefore, the transmitted signal is wirelessly transmitted from the transmission antenna 512 to the base station, and the RSRP and RSRQ are reported to the base station.

(Modification of the Measurement Circuit)

Figure 9:
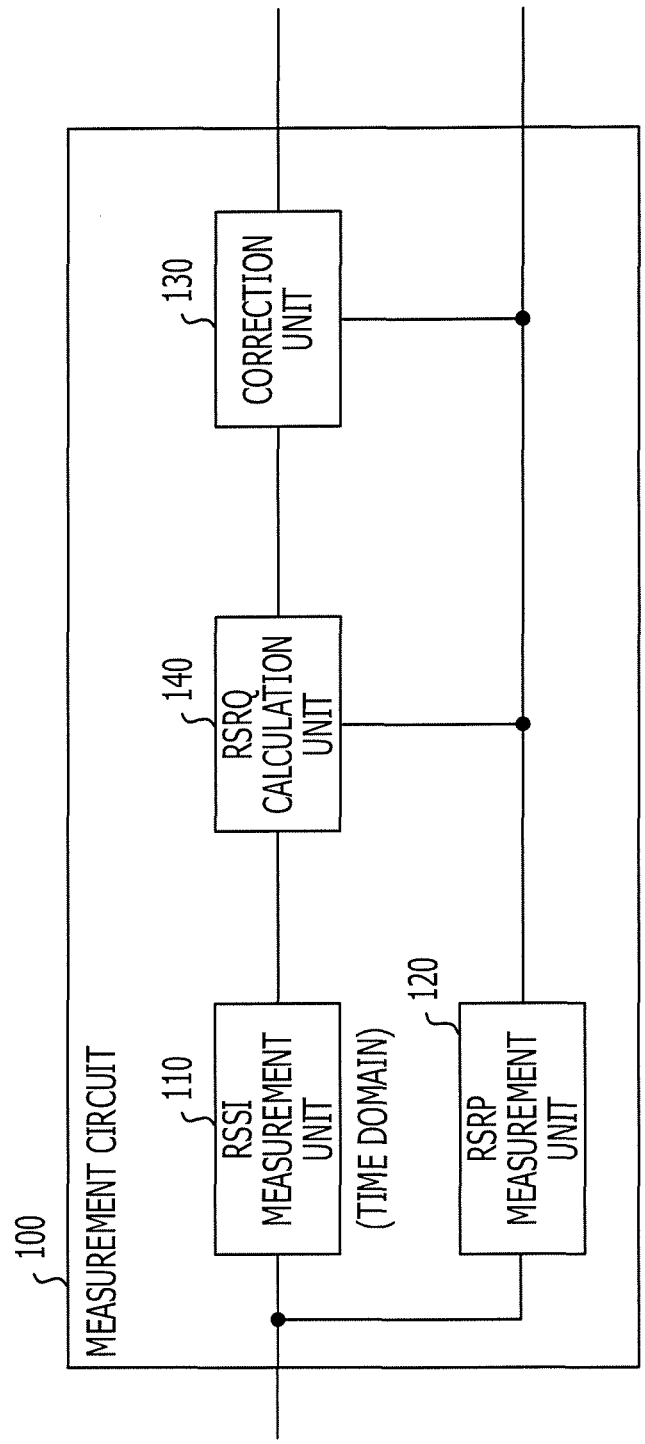
FIG. 9 is a diagram illustrating a modification of the measurement circuit.
Figure 10:
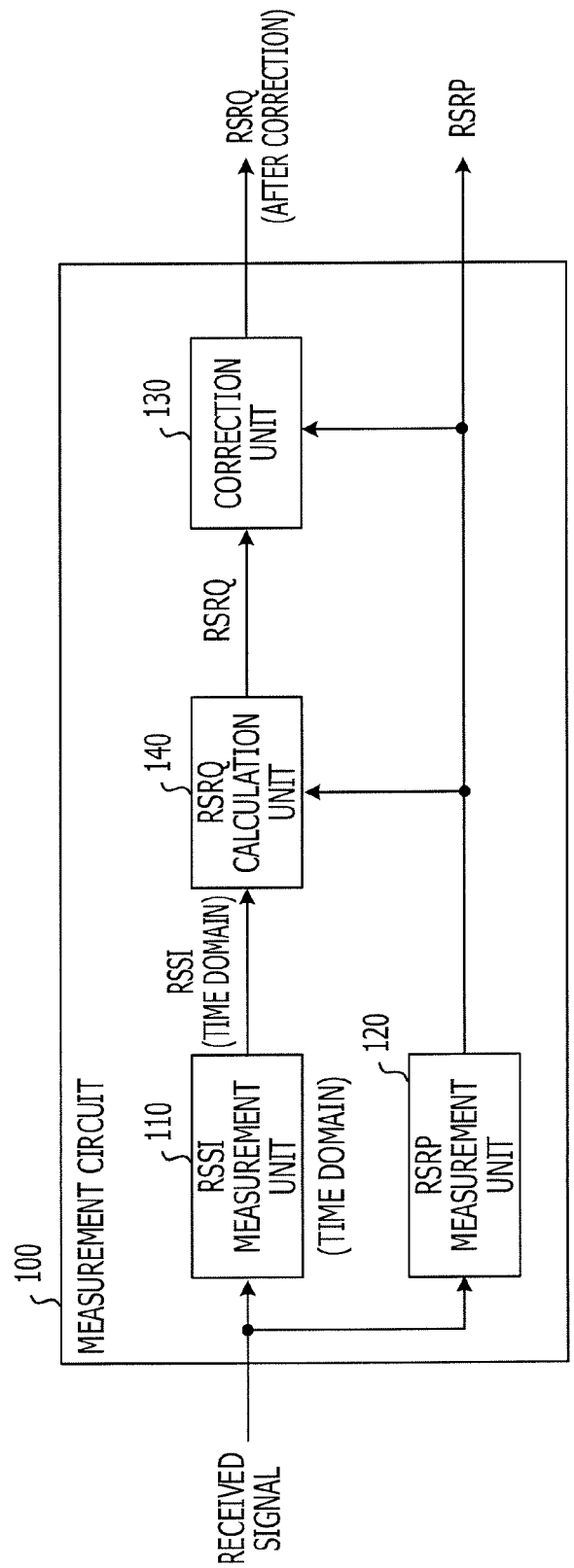
FIG. 10 is a diagram illustrating an example of a flow of a signal in the measurement circuit illustrated in FIG. 9.

FIG. 9 is a diagram illustrating a modification of the measurement circuit. FIG. 10 is a diagram illustrating an example of a flow of a signal in the measurement circuit illustrated in FIG. 9. In FIGS. 9 and 10, the same reference numerals are given to portions that are similar to those of FIGS. 1 and 2, and the description is omitted herein. As illustrated in FIGS. 9 and 10, the RSSI measurement unit 110 may output an RSSI that is measured in the time domain to the RSRQ calculation unit 140.

In this case, the RSRQ calculation unit 140 calculates RSRQ on the basis of the RSSI before correction, which is output from the RSSI measurement unit 110 and the RSRP that is output from the RSRP measurement unit 120. In addition, the RSRQ calculation unit 140 outputs the calculated RSRQ to the correction unit 130. The correction unit 130 corrects the RSRQ that is output from the RSRQ calculation unit 140 on the basis of the RSRP that is output from the RSRP measurement unit 120. The correction unit 130 outputs the corrected RSRQ from the measurement circuit 100.

As illustrated in FIGS. 9 and 10, RSRQ is calculated on the basis of the RSRP and the RSSI before correction, and the calculated RSRQ may be corrected using the RSRP. In this case, similar to the measurement circuit 100 illustrated in FIGS. 1 and 2, the RSRQ is calculated accurately without measuring the RSSI in the frequency domain. Therefore, the RSRQ is obtained accurately while an increase in a processing amount is suppressed.

As described above, in the measurement circuit 100 according to the first embodiment, RSRQ is calculated accurately by correcting the RSSI that is measured in the time domain using the RSRP that is measured to be output with the RSRQ, without measuring the RSSI in the frequency domain. Therefore, the RSRQ is calculated accurately while an increase in a processing amount is suppressed.

Alternatively, RSRQ is obtained accurately by calculating the RSRQ on the basis of RSRP and an RSSI before correction, and correcting the calculated RSRQ using the RSRP, without measuring the RSSI in the frequency domain. Therefore, the RSRQ is calculated accurately while an increase in a processing amount is suppressed.

Second Embodiment

In a second embodiment, a portion that is different from that of the first embodiment is described. For example, when reception electric field strength in the wireless terminal 500 is low, an impact due to thermal noise inside the wireless terminal 500 on an RSSI is increased.

Therefore, thermal noise power outside the measurement bandwidth Nmeas is also desired to be corrected similar to that of the interference power, and for example, there is a case in which the thermal noise power varies depending on frequency band due to an effect of the analog filter 524. In addition, a measurement circuit 100 according to the second embodiment may obtain a highly accurate RSSI by correcting the RSSI using information on thermal noise power and frequency response of the analog filter 524.

(Structure of the Measurement Circuit According to the Second Embodiment)

Figure 11:
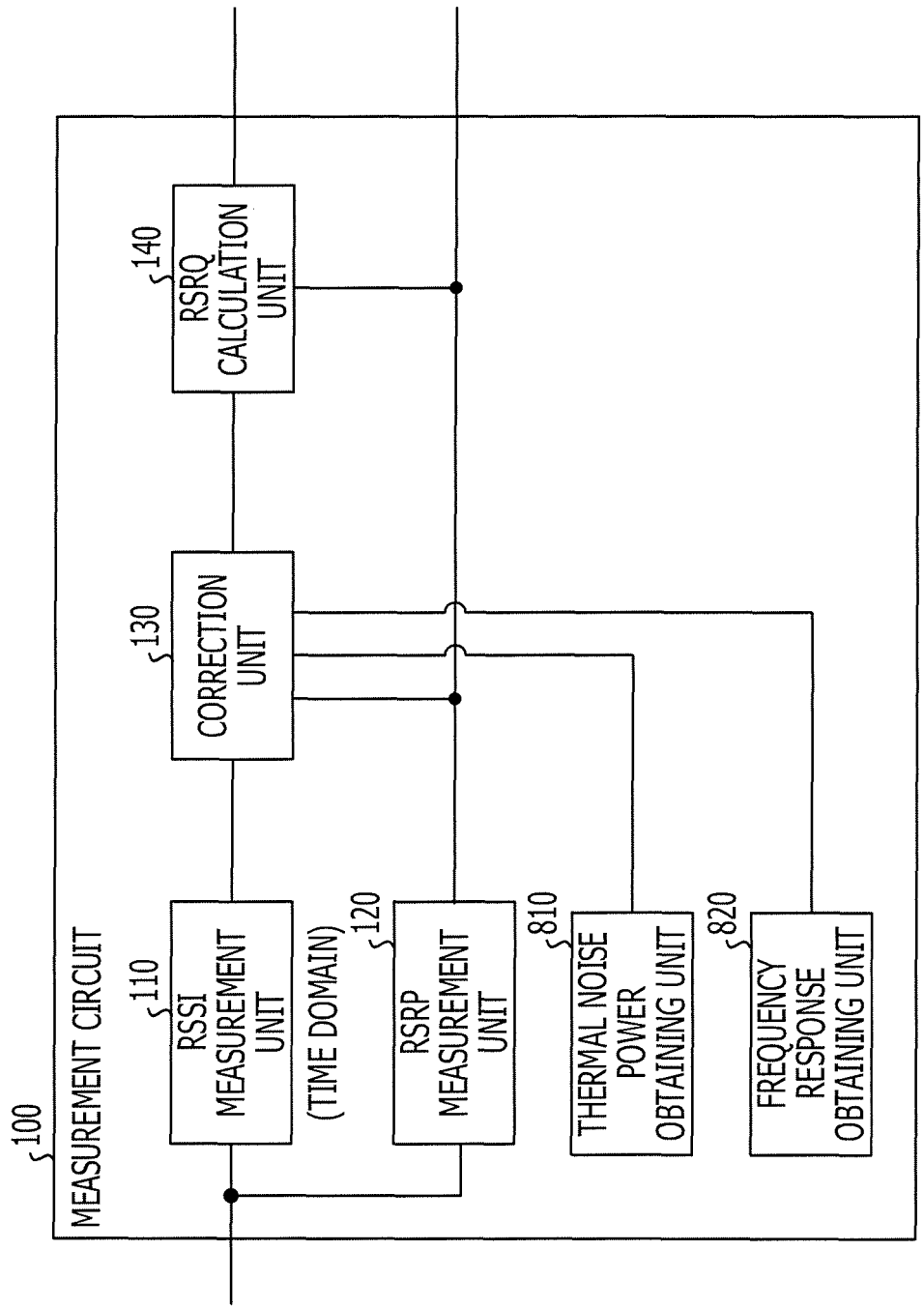
FIG. 11 is a diagram illustrating an example of a structure of a measurement circuit according to a second embodiment.
Figure 12:
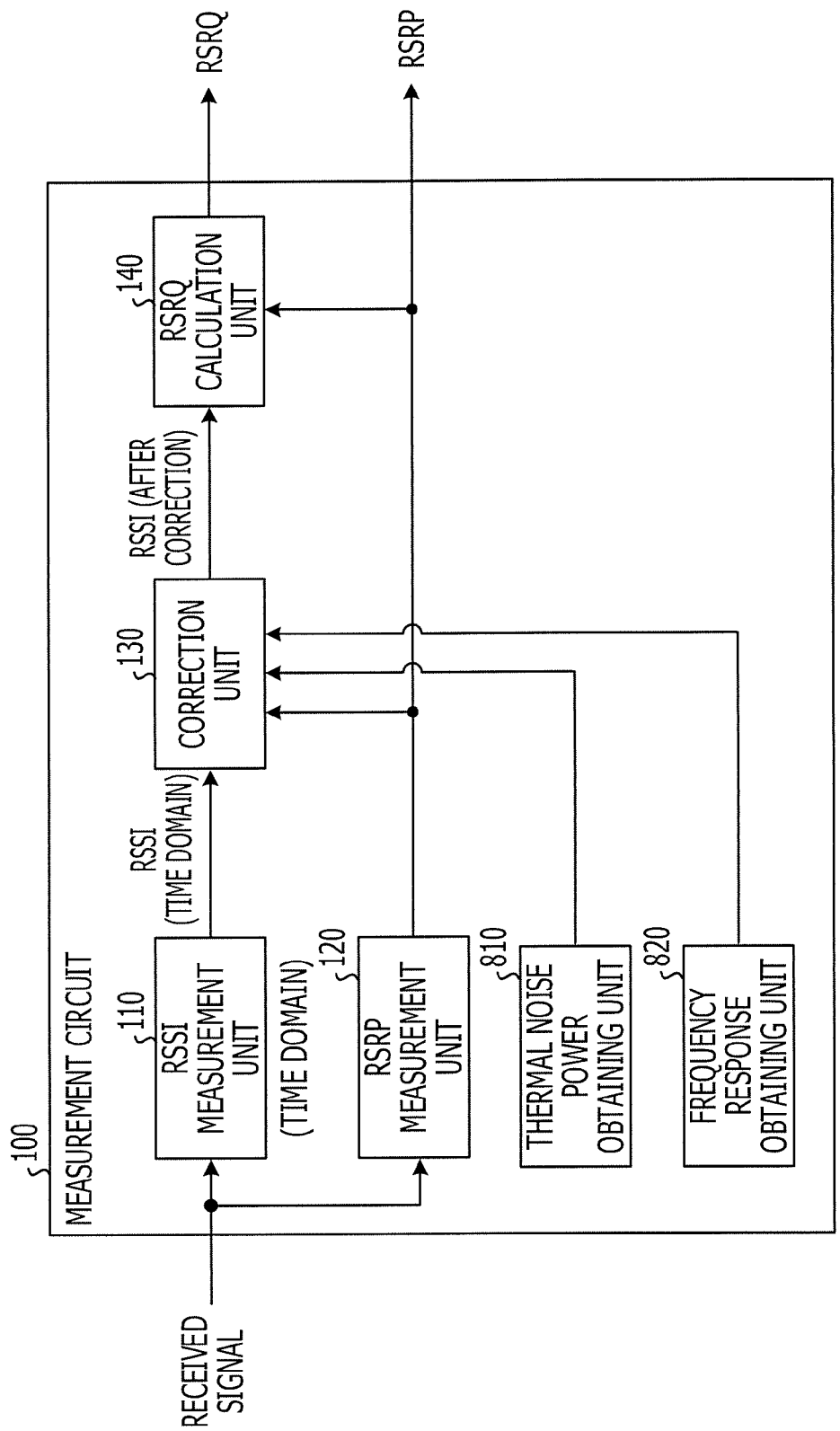
FIG. 12 is a diagram illustrating an example of a flow of a signal in the measurement circuit illustrated in FIG. 11.

FIG. 11 is a diagram illustrating an example of a structure of the measurement circuit according to the second embodiment. FIG. 12 is a diagram illustrating an example of a flow of a signal in the measurement circuit illustrated in FIG. 11. In FIGS. 11 and 12, the same reference numerals are given to portions that are similar to those of FIGS. 1 and 2, and the description is omitted herein. As illustrated in FIGS. 11 and 12, the measurement circuit 100 according to the second embodiment includes a thermal noise power obtaining unit 810 and a frequency response obtaining unit 820 in addition to the structure illustrated in FIGS. 1 and 2.

The thermal noise power obtaining unit 810 obtains, for example, thermal noise power information that indicates power of thermal noise that is generated in the analog circuit 520 illustrated in FIGS. 6 and 7. For example, the power of the thermal noise that is generated in the analog circuit 520 is allowed to be obtained at the stage of design of the analog circuit 520, so that thermal noise power information is allowed to be stored in a memory of the measurement circuit 100. In this case, the thermal noise power obtaining unit 810 obtains the thermal noise power information from the memory of the measurement circuit 100. The thermal noise power obtaining unit 810 outputs the obtained thermal noise power information to the correction unit 130.

The frequency response obtaining unit 820 obtains, for example, frequency response information that indicates frequency response characteristics in the analog filter 524 illustrated in FIGS. 6 and 7. For example, the frequency response characteristics in the analog filter 524 are allowed to be obtained at the stage of design of the analog circuit 520, so that frequency response information is allowed to be stored in the memory of the measurement circuit 100. In this case, the frequency response obtaining unit 820 obtains the frequency response information from the memory of the measurement circuit 100. The frequency response obtaining unit 820 outputs the obtained frequency response information to the correction unit 130.

The correction unit 130 corrects the RSSI that is output from the RSSI measurement unit 110 on the basis of the RSRP that is output from the RSRP measurement unit 120, the thermal noise power information that is output from the thermal noise power obtaining unit 810, and the frequency response information that is output from the frequency response obtaining unit 820.

Therefore, even when the thermal noise is large for the reception electric field strength, a highly accurate RSSI is obtained. Therefore, the RSRQ is calculated accurately in the RSRQ calculation unit 140.

(Frequency Response Characteristics of the Analog Filter)

Figure 13A:
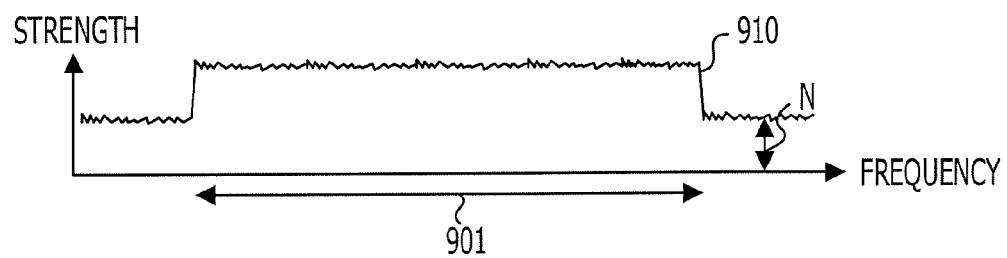
FIG. 13A is a diagram illustrating an example of a received signal.

FIG. 13A is a diagram illustrating an example of a received signal. In FIG. 13A, the horizontal axis indicates a frequency, the vertical axis indicates strength. A received signal 910 indicates a received signal at the former stage of the analog filter 524 of the wireless terminal 500. An effective bandwidth 901 indicates an effective bandwidth of the received signal 910.

For example, the effective bandwidth 901 corresponds to the above-described system bandwidth Ndl. The received signal 910 includes an interference signal and a noise component, and as illustrated in FIG. 13A, a noise component and the like are included in a band outside the effective bandwidth 901 as well. In the band outside the effective bandwidth 901, strength of the received signal 910 is increased by thermal noise power N.

Figure 13B:
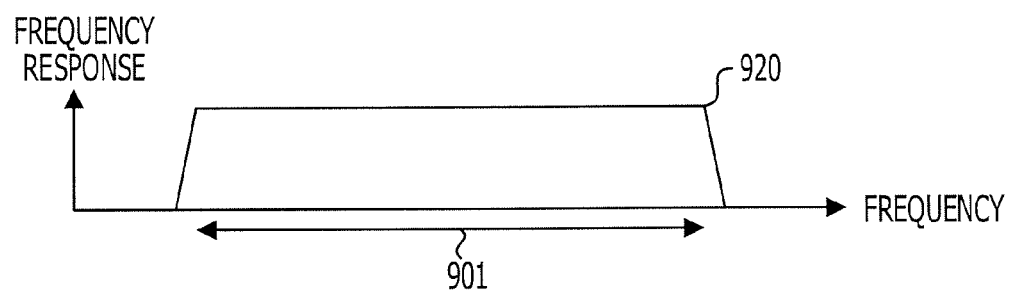
FIG. 13B is a diagram illustrating examples of a frequency response of an analog filter.

FIG. 13B is a diagram illustrating examples of a permeation characteristic (frequency response) of the analog filter. In FIG. 13B, the horizontal axis indicates a frequency, and the vertical axis indicates a frequency response. A frequency response 920 is a characteristic of a permeation rate for a frequency in the analog filter 524. As illustrated in the frequency response 920, the analog filter 524 has a high permeation rate in the effective bandwidth 901, and has a low permeation rate in the band outside the effective bandwidth 901. The frequency response information that is obtained by the frequency response obtaining unit 820 is, for example, information that indicates the frequency response 920 illustrated in FIG. 13B.

Figure 13C:
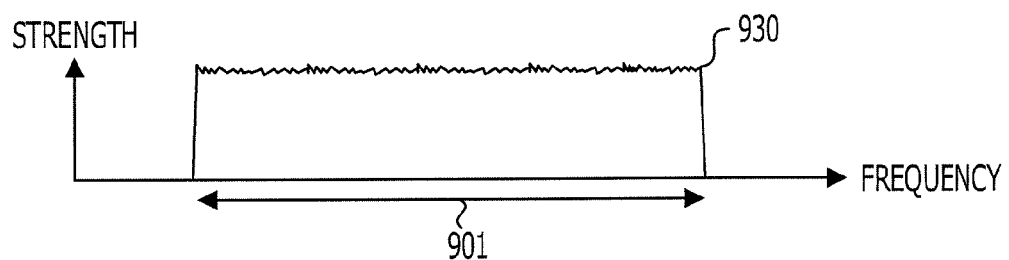
FIG. 13C is a diagram illustrating an example of a received signal that is permeated through the analog filter.

FIG. 13C is a diagram illustrating an example of a received signal that has been permeated through the analog filter. In FIG. 13C, the horizontal axis indicates a frequency, and the vertical axis indicates strength. A received signal 930 indicates a received signal that has been permeated through the analog filter 524 of the wireless terminal 500. Due to the frequency response 920 illustrated in FIG. 13B, the received signal 930 is obtained by extracting a component of the merely effective bandwidth 901 from the received signal 910 illustrated in FIG. 13A.

(Thermal Noise Power of the Analog Circuit)

Figure 14A:
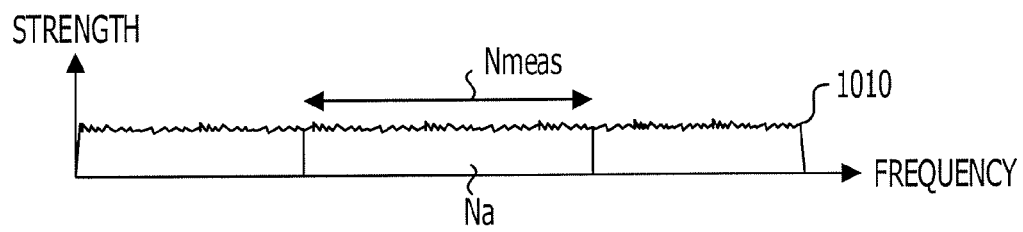
FIG. 14A is a diagram illustrating an example of thermal noise that is generated in an analog circuit.

FIG. 14A is a diagram illustrating an example of thermal noise that is generated in the analog circuit. In FIG. 14A, the horizontal axis indicates a frequency, and the vertical axis indicates strength. Thermal noise 1010 indicates thermal noise that is generated in the analog circuit 520. The thermal noise 1010 is, for example, noise that is generated by irregular thermal motion of free electrons in the analog circuit 520, and the thermal noise power that is viewed from the digital baseband signal processing unit 530 is evaluated as the whole analog circuit 520.

The thermal noise power information that is obtained by the thermal noise power obtaining unit 810 is, for example, information that indicates the thermal noise 1010. The correction unit 130 may extract thermal noise that is included in the measurement bandwidth Nmeas that is notified from the base station or the like, from the thermal noise 1010 that is indicated by the thermal noise power information that is output from the thermal noise power obtaining unit 810, and may calculate power of the extracted thermal noise. Therefore, thermal noise power Na that is included in the measurement bandwidth Nmeas is obtained. For example, the thermal noise power Na is calculated by integrating pieces of strength of portions that are included in the measurement bandwidth Nmeas, in the thermal noise 1010.

Figure 14B:
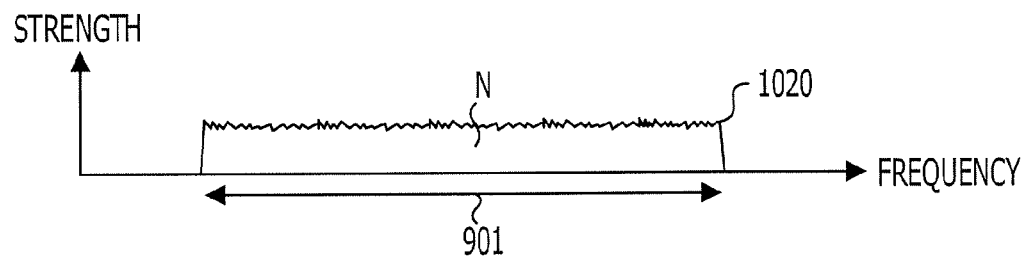
FIG. 14B is a diagram illustrating an example of change in thermal noise due to the analog filter.

FIG. 14B is a diagram illustrating an example of change in thermal noise due to the analog filter. In FIG. 14B, the horizontal axis indicates a frequency, and the vertical axis indicates strength. The thermal noise 1010 illustrated in FIG. 14A becomes noise such as the thermal noise 1020 illustrated in FIG. 14B due to the analog filter 524. That is, due to the frequency response 920 illustrated in FIG. 13B, the thermal noise 1020 becomes noise that is obtained by extracting the component of the merely effective bandwidth 901 (see FIG. 13B).

The correction unit 130 obtains the thermal noise 1020 on the basis of the thermal noise 1010 that is indicated by the thermal noise power information that is output from the thermal noise power obtaining unit 810 and the frequency response 920 that is indicated by the frequency response information that is output from the frequency response obtaining unit 820. For example, the correction unit 130 obtains the thermal noise 1020 by multiplying the strength of the thermal noise 1010 by the permeation rate of the frequency response 920 for each frequency. Therefore, the thermal noise power N that is included in the system bandwidth Ndl (effective bandwidth 901) is obtained. For example, the thermal noise power N is calculated by integrating the pieces of strength of the thermal noise 1020.

(RSSI that is Measured by the RSSI Measurement Unit)

Figure 15A:
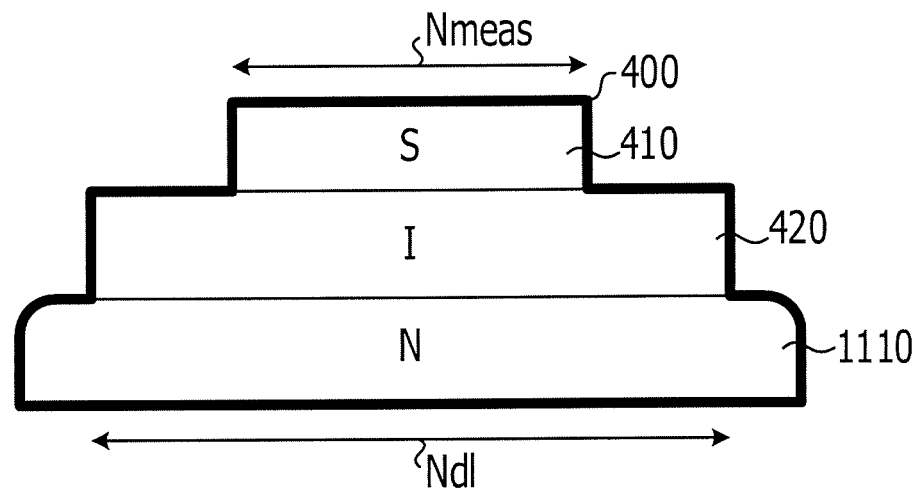
FIG. 15A is a diagram illustrating an example of an RSSI that is measured by the RSSI measurement unit.

FIG. 15A is a diagram illustrating an example of an RSSI that is measured by the RSSI measurement unit. In FIG. 15A, the same reference numerals are given to portions that are similar to those of FIG. 5A, and the description is omitted herein.

As illustrated in FIG. 15A, in the RSSI 400 that is measured in the time domain, the signal power 410 of the measurement target cell, the interference power 420 from the serving cell, and thermal noise power 1110 are included. In addition, in the RSSI 400 that is measured in the time domain, thermal noise power in an area broader than the system bandwidth Ndl is also included in addition to the interference power of the whole system bandwidth Ndl. Therefore, in the RSSI 400, the interference power and thermal noise power outside the measurement bandwidth Nmeas are also included.

The size of the signal power 410 is represented as "S", the size of the interference power 420 is represented as "I", and the size of the thermal noise power 1110 is represented as "N". In this case, the size of the RSSI 400 that is measured by the RSSI measurement unit 110 is represented, for example, by the following formula (5).

[Mathematical Expression 5]

$$\text{RSSI} = S + I + N$$
$$\therefore I = \text{RSSI} - S - N \quad (5)$$

(RSSI that is Measured in the Frequency Domain)

Figure 15B:
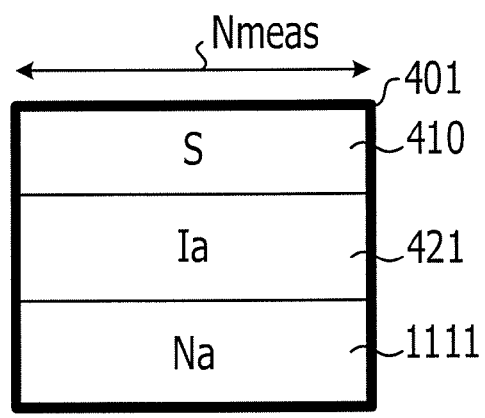
FIG. 15B is a diagram illustrating an example of an RSSI that is measured in the frequency domain.

FIG. 15B is a diagram illustrating an example of an RSSI that is measured in the frequency domain. In FIG. 15B, the same reference numerals are given to portions that are similar to those of FIG. 15A, and the description is omitted herein. When the RSSI is measured by transforming a received signal into a frequency domain by FFT, as illustrated in FIG. 15B, the RSSI 401 of the measurement bandwidth Nmeas is merely measured. The interference power 421 illustrated in FIG. 15B is interference power that is included in the measurement bandwidth Nmeas. The size of the interference power 421 is represented as "Ia". The thermal noise power 1111 illustrated in FIG. 15B is thermal noise power that is included in the measurement bandwidth Nmeas. The size of the thermal noise power 1111 is represented as "Na".

When the size of the RSSI 401 is represented as "RSSIa", "RSSIa" is represented, for example, by the following formula (6). That is, the interference power I that is measured in the time domain is converted by a ratio of the system bandwidth Ndl to the measurement bandwidth Nmeas, and "RSSIa" is calculated by adding the converted interference power to the thermal noise power Na and the signal power S of the measurement target cell.

[Mathematical expression 6]

$$RSSIa = S + \frac{Nmeas}{Ndl} I + Na \quad (6)$$

When the above-described formula (5) is substituted into the above-described formula (6), the size RSSIa of the RSSI 401 of the measurement bandwidth Nmeas is merely represented by the following formula (7).

[Mathematical expression 7]

$$RSSIa = S + \frac{Nmeas}{Ndl}(RSSI - S - N) + Na \quad (7)$$
$$= \frac{Nmeas \cdot (RSSI - N) + (Ndl - Nmeas) \cdot S}{Ndl} + Na$$

In addition, as described above, for example, since an RB contains 12 subcarriers, the size S of the signal power 410 is represented by the following formula (8) using the RSRP that is measured by the RSRP measurement unit 120.

[Mathematical Expression 8]

$$S = RSRP \times 12 \times N_{meas} \qquad (8)$$

The correction unit 130 corrects the RSSI that is output from the RSSI measurement unit 110, on the basis of the above-described formulas (7) and (8), the RSRP, the system bandwidth Ndl, the measurement bandwidth Nmeas, the size N of the thermal noise power 1110, and the size Na of the thermal noise power 1111. Therefore, the size RSSIa of the RSSI 401 is obtained.

The correction unit 130 outputs the size RSSIa of the RSSI 401 of the merely measurement bandwidth Nmeas to the RSRQ calculation unit 140. The RSRP is RSRP that is output from the RSRP measurement unit 120 to the correction unit 130. For example, the system bandwidth Ndl and the measurement bandwidth Nmeas have been already notified from the base station or the like.

The size N of the thermal noise power 1110 is calculated by integrating pieces of strength of the thermal noise 1020 on the basis of the thermal noise power information (for example, see FIG. 14B). The size Na of the thermal noise power 1111 is calculated by integrating pieces of strength of portions that are included in the measurement bandwidth Nmeas in the thermal noise 1010, on the basis of the thermal noise power information and the frequency response information (for example, see FIG. 14A).

As described above, the correction unit 130 performs correction so that interference power and thermal noise power in a band that is different from the measurement bandwidth Nmeas are removed from the RSSI that is measured by the RSSI measurement unit 110. At that time, the correction unit 130 uses the RSRP, the system bandwidth Ndl, the measurement bandwidth Nmeas, information that indicates a frequency response characteristic of the analog filter 524, and information that indicates thermal noise of the analog circuit 520.

Therefore, for example, RSSI that is defined in 3GPP, that is, an average value of total reception power (serving cell, neighboring cell, thermal noise, and the like) that are observed in OFDM symbols that include RSs on the certain number of resource blocks is obtained.

(Operation of the Wireless Terminal According to the Second Embodiment)

Figure 16:
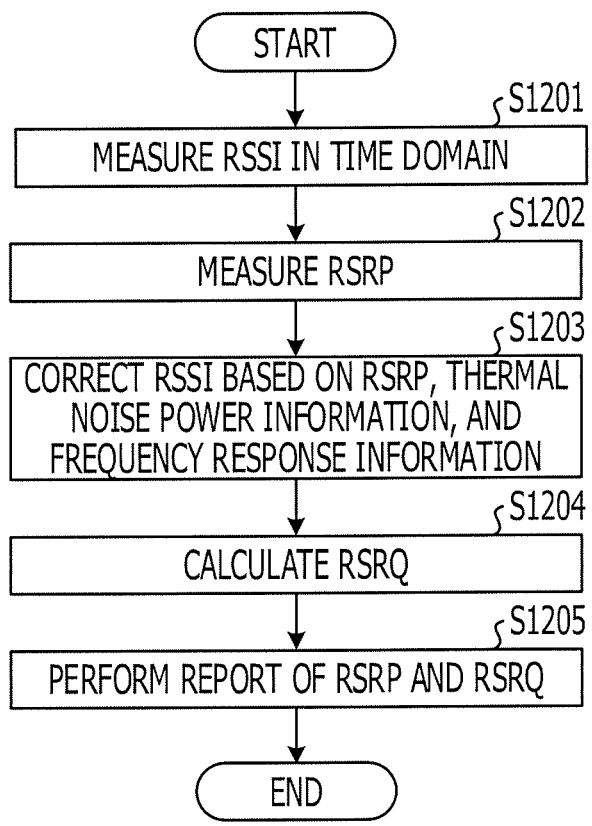
FIG. 16 is a flowchart illustrating an example of an operation of a wireless terminal according to the second embodiment.

FIG. 16 is a flowchart illustrating an example of an operation of the wireless terminal according to the second embodiment. The measurement circuit 100 executes each step illustrated in FIG. 16, for example, for each certain report cycle to the base station. Steps S1201 to S1205 illustrated in FIG. 16 are similar to Step S601 to S605 illustrated in FIG. 8.

In Step S1203, the measurement circuit 100 corrects the RSSI that is measured in Step S1201 on the basis of the RSRP that is measured in Step S1202, the thermal noise power information, and the frequency response information (Step S1203). Therefore, a further highly accurate RSSI is obtained. Therefore, in Step S1205, further highly accurate RSRQ is reported to the base station or the like.

As described above, in the measurement circuit 100 according to the second embodiment, the RSSI that is measured in the time domain is corrected on the basis of the information that indicates the frequency response characteristic of the analog filter 524 and the information that indicates the thermal noise of the analog circuit 520. Therefore, the RSRQ is calculated further accurately.

In addition, in the second embodiment, as illustrated in FIGS. 9 and 10, the RSRQ may be calculated on the basis of the RSRP and the RSSI before correction. In this case, the calculated RSRQ is corrected on the basis of the RSRP, the information that indicates the frequency response characteristics of the analog filter 524, and the information that indicates the thermal noise of the analog circuit 520. Therefore, similar to the measurement circuit 100 illustrated in FIGS. 11 and 12, the RSRQ is calculated further accurately.

(Measurement Result of RSSI)

Figure 17:
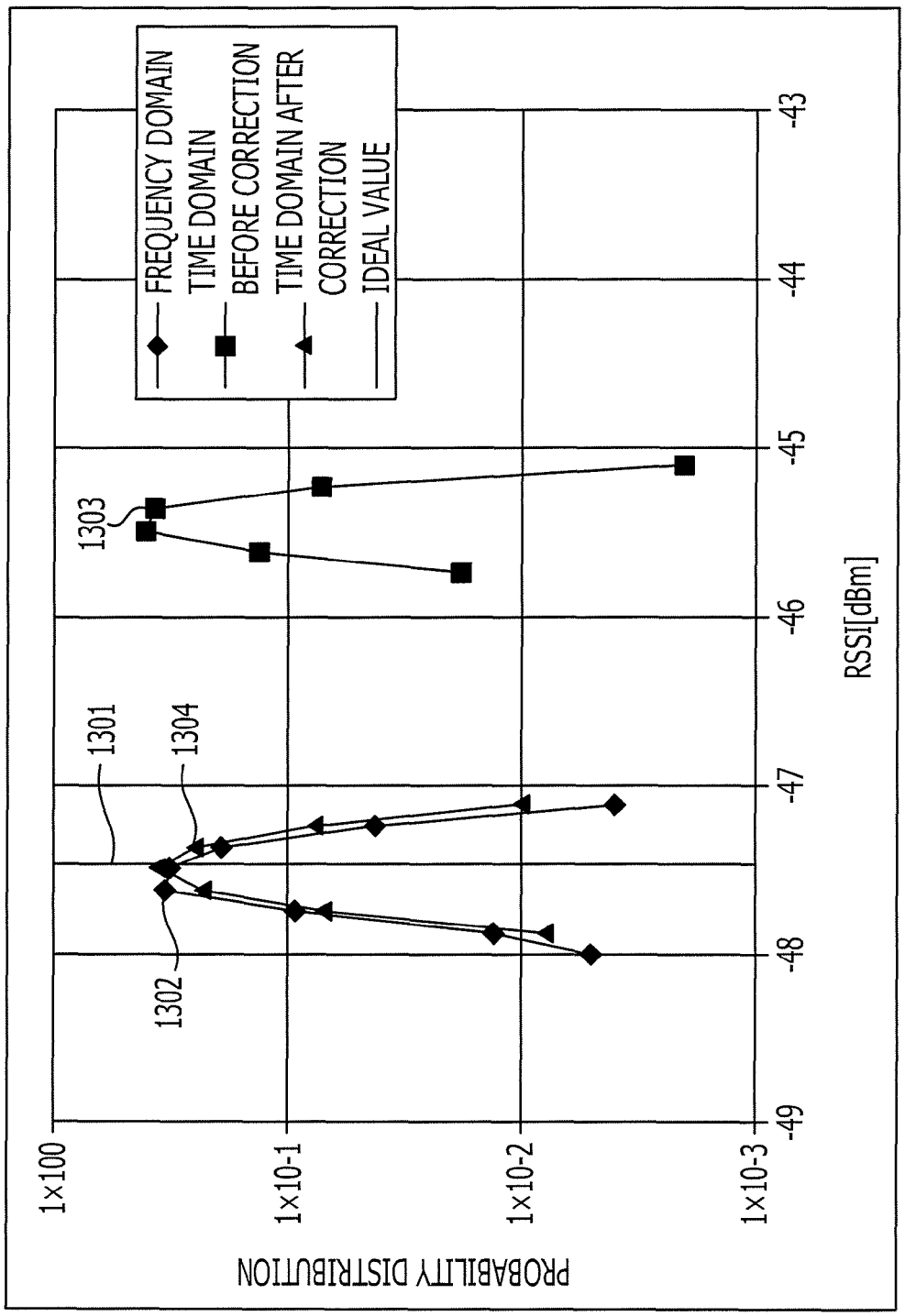
FIG. 17 is a diagram illustrating an example of a measurement result of RSSIs.

FIG. 17 is a diagram illustrating an example of a measurement result of RSSIs. In FIG. 17, the horizontal axis indicates an RSSI [dBm], and the vertical axis indicates probability distribution. An ideal value 1301 indicates ideal probability distribution of the RSSIs. A measurement result 1302 indicates probability distribution of the RSSI that is measured in the frequency domain as a reference. In the measurement result 1302, the RSSIs are distributed using the ideal value 1301 as the center.

A measurement result 1303 (time domain before correction) indicates probability distribution of the RSSIs that are measured in the time domain in the RSSI measurement unit 110. Due to the interference power outside the effective bandwidth, the RSSIs are distributed using a value that is deviated from the ideal value 1301 as the center, in the measurement result 1303. A measurement result 1304 (time domain after correction) indicates probability distribution of the RSSIs that are obtained by correcting the RSSIs that are measured in the time domain in the RSSI measurement unit 110, by the correction unit 130. In the measurement result 1304, similar to the measurement result 1303 in the frequency domain, the RSSIs are distributed using a value that is deviated from the ideal value 1301 as the center.

As described above, by correcting RSSIs that are measured in the time domain by RSRP, an RSSI that has a configuration that is obtained when a RSSI is measured in the frequency domain is obtained. Therefore, RSRQ is accurately obtained while an increase in a processing amount is suppressed.

As described above, in the measurement circuit, the wireless communication device, and the measurement method according to the embodiments, RSRQ is measured efficiently.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A measurement circuit comprising:
   a memory; and
   a processor coupled to the memory and configured
   to measure a first signal strength of a received signal within a first frequency band, the received signal including a signal transmitted from a first transmitting apparatus within the first frequency band and a signal transmitted from a second transmitting apparatus within a second frequency band that constitutes a part of the first frequency band,
   to generate a second signal strength of the signal transmitted from the second transmitting apparatus within the second frequency band, and to generate a third signal strength of the received signal within the second frequency band based on the first signal strength and the second signal strength.

2. The measurement circuit according to claim 1, wherein the processor is configured to measure a received power of a reference signal included in the signal transmitted from the second transmitting apparatus within the second frequency band, and the second signal strength is generated by the received power.

3. The measurement circuit according to claim 2, wherein the processor is configured to generate a received quality of the reference signal based on the third signal strength and the received power of the reference signal.

4. The measurement circuit according to claim 1, wherein the first transmitting apparatus is a serving base station of a terminal which includes the measurement circuit, and the second transmitting apparatus is a candidate of a target base station for handover performed by the terminal.

5. The measurement circuit according to claim 1, wherein the first signal strength is measured in a time domain.

6. The measurement circuit according to claim 1, wherein the processor is configured to generate the third signal strength without measuring the received signal within the second frequency band in a frequency domain.

7. The measurement circuit according to claim 1, wherein the processor is configured to generate the third signal strength by excluding an interference power for a third frequency band of the first frequency band other than the second frequency band, from the first signal strength based on the second signal strength.

8. A wireless communication device comprising:
an antenna configured to receive a signal including a signal transmitted from a first transmitting apparatus within a first frequency band and a signal transmitted from a second transmitting apparatus within a second frequency band that constitutes a part of the first frequency band; and
a processor configured
to measure a first signal strength of the received signal within the first frequency band,
to generate a second signal strength of the signal transmitted from the second transmitting apparatus within the second frequency band, and
to generate a third signal strength of the received signal within the second frequency band based on the first signal strength and the second signal strength.

9. The wireless communication device according to claim 8, wherein
the processor is configured to measure a received power of a reference signal included in the signal transmitted from the second transmitting apparatus within the second frequency band, and the second signal strength is generated by the received power.

10. The wireless communication device according to claim 9, wherein
the processor is configured to generate a received quality of the reference signal based on the third signal strength and the received power of the reference signal.

11. The wireless communication device according to claim 8, wherein
the first transmitting apparatus is a serving base station of the wireless communication device, and the second transmitting apparatus is a candidate of a target base station for handover performed by the wireless communication device.

12. The wireless communication device according to claim 8, wherein
the first signal strength is measured in a time domain.

13. The wireless communication device according to claim 8, further comprising:
an analog circuit configured to perform analog processing for the received signal, the analog circuit including an analog filter with a frequency response characteristic and an analog to digital converter,
wherein the processor is configured to calculate the third signal strength, by using a thermal noise of the analog circuit and the frequency response characteristic.

14. A measurement method comprising:
measuring a first signal strength of a received signal within a first frequency band, the received signal including a signal transmitted from a first transmitting apparatus within the first frequency band and a signal transmitted from a second transmitting apparatus within a second frequency band that constitutes a part of the first frequency band;
generating a second signal strength of the signal transmitted from the second transmitting apparatus within the second frequency band; and
generating a third signal strength of the received signal within the second frequency band based on the first signal strength and the second signal strength.

15. The measurement method according to claim 14, further comprising:
measuring a received power of a reference signal included in the signal transmitted from the second transmitting apparatus within the second frequency band, and the second signal strength is generated by the received power.

16. The measurement method according to claim 15, further comprising:
generating a received quality of the reference signal based on the third signal strength and the received power of the reference signal.

17. The measurement method according to claim 14, wherein
the first transmitting apparatus is a serving base station of a terminal which performs the measurement method, and the second transmitting apparatus is a candidate of a target base station for handover performed by the terminal.

18. The measurement method according to claim 14, wherein
the first signal strength is measured in a time domain.

19. The measurement method according to claim 14, wherein
the third signal strength is generated without measuring the received signal within the second frequency band in a frequency domain.

20. The measurement method according to claim 14, wherein
the third signal strength is generated by excluding an interference power for a third frequency band of the first frequency band other than the second frequency band, from the first signal strength based on the second signal strength.

* * * * *